(12) United States Patent
Feng et al.

(10) Patent No.: US 12,550,467 B2
(45) Date of Patent: Feb. 10, 2026

(54) PRINT RECOGNITION SUBSTRATE AND PRINT RECOGNITION APPARATUS

(71) Applicants: Beijing BOE Sensor Technology Co., Ltd., Beijing (CN); BOE Technology Group Co., Ltd., Beijing (CN)

(72) Inventors: Yajie Feng, Beijing (CN); Cheng Li, Beijing (CN); Yue Geng, Beijing (CN); Kuiyuan Wang, Beijing (CN); Zhonghuan Li, Beijing (CN); Yi Dai, Beijing (CN); Chaoyang Qi, Beijing (CN); Zefei Li, Beijing (CN); Xiaoguan Li, Beijing (CN); Congcong Xi, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 484 days.

(21) Appl. No.: 18/249,501

(22) PCT Filed: Jun. 3, 2021

(86) PCT No.: PCT/CN2021/098186
§ 371 (c)(1),
(2) Date: Apr. 18, 2023

(87) PCT Pub. No.: WO2022/252192
PCT Pub. Date: Dec. 8, 2022

(65) Prior Publication Data
US 2023/0395625 A1    Dec. 7, 2023

(51) Int. Cl.
*H10F 39/00*    (2025.01)
*G06V 40/13*    (2022.01)

(52) U.S. Cl.
CPC ..... *H10F 39/8057* (2025.01); *G06V 40/1318* (2022.01); *H10F 39/802* (2025.01)

(58) Field of Classification Search
CPC .............. H10F 39/8057; H10F 39/802; G06V 40/1318; G06V 10/145
See application file for complete search history.

(56) References Cited

U.S. PATENT DOCUMENTS

2015/0369661 A1* 12/2015 Lin .................... G06V 40/1318
                                                                250/227.11
2018/0211079 A1*  7/2018 Liu .................... G06V 40/1318
(Continued)

FOREIGN PATENT DOCUMENTS

CN    106537313 A    3/2017
CN    106611170 A    5/2017
(Continued)

OTHER PUBLICATIONS

European Extended Search Report, mailed Nov. 11, 2023, from EP Application No. 21943555.9, 10 pages.

*Primary Examiner* — S M Sohel Imtiaz
(74) *Attorney, Agent, or Firm* — Workman Nydegger

(57) ABSTRACT

A print recognition substrate and a print recognition apparatus. The print recognition substrate includes a base substrate, which includes a data line and a gate line crossing each other; a light shielding structure, located on the base substrate, and including a metal layer, and an orthographic projection of the light shielding structure on the base substrate does not overlap with orthographic projections of the data line and the gate line on the base substrate; a photoelectric conversion structure, located on the side of the light shielding structure away from the base substrate, and an orthographic projection of the photoelectric conversion structure on the base substrate is located in an orthographic projection of the light shielding structure on the base substrate, and a distance between an edge of the photoelectric (Continued)

conversion structure and an edge of the light shielding structure is less than or equal to 3 µm.

20 Claims, 12 Drawing Sheets

(56) References Cited

U.S. PATENT DOCUMENTS

| | | | |
|---|---|---|---|
| 2019/0005295 A1* | 1/2019 | Jia | H01L 23/5329 |
| 2019/0354740 A1* | 11/2019 | Li | H10D 86/441 |
| 2020/0175243 A1* | 6/2020 | Liu | G06V 40/1318 |
| 2020/0343477 A1* | 10/2020 | Zeng | G09G 3/3275 |
| 2021/0064837 A1* | 3/2021 | Zeng | G06V 10/147 |
| 2021/0133418 A1* | 5/2021 | Liu | G06V 40/1318 |
| 2022/0019755 A1 | 1/2022 | Niu et al. | |
| 2022/0149108 A1* | 5/2022 | Yoo | G06V 40/1318 |

FOREIGN PATENT DOCUMENTS

| | | | |
|---|---|---|---|
| CN | 107301407 | A | 10/2017 |
| CN | 108279028 | A | 7/2018 |
| CN | 110174787 | A | 8/2019 |
| CN | 209496873 | U | 10/2019 |
| CN | 111708203 | A | 9/2020 |

* cited by examiner

PRINT RECOGNITION SUBSTRATE AND PRINT RECOGNITION APPARATUS

The present application is a National Stage of International Application No. PCT/CN2021/098186, filed on Jun. 3, 2021, which is hereby incorporated by reference in its entirety.

FIELD

The present disclosure relates to the technical field of print recognition, and in particular to a print recognition substrate and a print recognition apparatus.

BACKGROUND

As the information industry has developed at a high speed, biometric recognition technology has been used more and more widely, and in particular, since skin prints, such as fingerprints or palm prints, facilitate user identity confirmation due to uniqueness of skin lines, print recognition technology has been used extensively in various fields such as mobile terminals and smart homes to provide security for user information.

SUMMARY

Embodiments of the present disclosure provide a print recognition substrate and a print recognition apparatus, and the specific solutions are as follows.

In one aspect, embodiments of the present disclosure provide a print recognition substrate, including: a base substrate, which includes a data line and a gate line crossing each other; a light shielding structure, located on the base substrate, and including at least one metal layer, wherein an orthographic projection of the light shielding structure on the base substrate does not overlap with orthographic projections of the data line and the gate line on the base substrate; a photoelectric conversion structure, located on a side of the light shielding structure away from the base substrate, wherein an orthographic projection of the photoelectric conversion structure on the base substrate is located in the orthographic projection of the light shielding structure on the base substrate, and a distance between an edge of the photoelectric conversion structure and an edge of the light shielding structure is less than or equal to 3 μm.

Optionally, in the above print recognition substrate provided by an embodiment of the present disclosure, the light shielding structure includes a first electrode, and the first electrode is in the same layer as the gate line.

Optionally, in the above print recognition substrate provided by an embodiment of the present disclosure, the light shielding structure includes a second electrode, the second electrode is in the same layer as the data line.

Optionally, in the above print recognition substrate provided by embodiments of the present disclosure, the light shielding structure includes the first electrode and the second electrode, the first electrode is in the same layer as the gate line, the second electrode is in the same layer as the data line, and in an extending direction of the gate line, an orthographic projection of the edge of the photoelectric conversion structure on the base substrate is located in an orthographic projection of the first electrode on the base substrate, and in an extending direction of the data line, an orthographic projection of the edge of the photoelectric conversion structure on the base substrate is located in an orthographic projection of the second electrode on the base substrate.

Optionally, in the above print recognition substrate provided by an embodiment of the present disclosure, both ends of an edge of the photoelectric conversion structure close to the data line and both ends of an edge of the photoelectric conversion structure away from the data line are provided with chamfers recessed toward a center of the photoelectric conversion structure.

Optionally, in the above print recognition substrate provided by an embodiment of the present disclosure, a maximum distance between an edge of a chamfer and an edge of the second electrode is not less than 0 μm to 3 μm, and a maximum distance between an edge of the chamfer and an edge of the first electrode is not less than 0 μm to 3 μm.

Optionally, in the above print recognition substrate provided by an embodiment of the present disclosure, the orthographic projection of the photoelectric conversion structure on the base substrate has a first overlap area with the orthographic projection of the second electrode on the base substrate, and a ratio of the first overlap area to an area of the orthographic projection of the second electrode on the base substrate ranges from 0.6 to 0.8.

Optionally, in the above print recognition substrate provided by an embodiment of the present disclosure, the orthographic projection of the photoelectric conversion structure on the base substrate has a second overlap area with the orthographic projection of the first electrode on the base substrate, and a ratio of the second overlap area to an area of the orthographic projection of the first electrode on the base substrate ranges from 0.7 to 0.9.

Optionally, in the above print recognition substrate provided by an embodiment of the present disclosure, the orthographic projection of the first electrode on the base substrate has a third overlap area with the orthographic projection of the second electrode on the base substrate, and a ratio of the third overlap area to an area of the orthographic projection of the second electrode on the base substrate ranges from 0.5 to 0.8.

Optionally, in the above print recognition substrate provided by an embodiment of the present disclosure, the orthographic projection of the first electrode on the base substrate has a third overlap area with the orthographic projection of the second electrode on the base substrate, and a ratio of the third overlap area to an area of the orthographic projection of the first electrode on the base substrate ranges from 0.6 to 0.8.

Optionally, in the above print recognition substrate provided by an embodiment of the present disclosure, a minimum distance between the second electrode and the data line is a first distance, a second distance is between the orthographic projection of the first electrode on the base substrate and the orthographic projection of the data line on the base substrate, a minimum distance between the orthographic projection of the photoelectric conversion structure on the base substrate and the orthographic projection of the data line on the base substrate is a third distance, and the third distance is greater than the second distance and less than the first distance.

Optionally, in the above print recognition substrate provided by an embodiment of the present disclosure, the first distance $d_1$, the second distance $d_2$, and the third distance $d_3$ satisfy: $d_1:d_2:d_3$ ranges from 5:2:3 to 5:2:4.9.

Optionally, in the above print recognition substrate provided by an embodiment of the present disclosure, the first distance ranges from 7 µm to 9 µm, the second distance ranges from 3 µm to 5 µm, and the third distance ranges from 5 µm to 7 µm.

Optionally, in the above print recognition substrate provided by an embodiment of the present disclosure, a minimum distance between the orthographic projection of the second electrode on the base substrate and the orthographic projection of the gate line on the base substrate is a fourth distance, a minimum distance between the first electrode and the gate line is a fifth distance, a minimum distance between the orthographic projection of the photoelectric conversion structure on the base substrate and the orthographic projection of the gate line on the base substrate is a sixth distance, and the sixth distance is greater than the fourth distance and less than the fifth distance.

Optionally, in the above print recognition substrate provided by an embodiment of the present disclosure, the fourth distance $d_4$, the fifth distance $d_5$, and the sixth distance $d_6$ satisfy: $d_4:d_5:d_6$ ranges from 2:6:5 to 2:6:4.

Optionally, in the above print recognition substrate provided by an embodiment of the present disclosure, the fourth distance ranges from 2 µm to 5 µm, the fifth distance ranges from 7 µm to 9 µm, and the sixth distance ranges from 5 µm to 7 µm.

Optionally, the above print recognition substrate provided by an embodiment of the present disclosure further includes a transistor, wherein a gate of the transistor is in the same layer as the gate line, and a first pole and a second pole of the transistor are in the same layer as the data line; the gate of the transistor is electrically connected to the gate line, the first pole of the transistor is electrically connected to the data line, and the second pole of the transistor is electrically connected to the second electrode; and an orthographic projection of the transistor on the base substrate does not overlap with the orthographic projection of the first electrode on the base substrate and the orthographic projection of the photoelectric conversion structure on the base substrate.

Optionally, in the above print recognition substrate provided by an embodiment of the present disclosure, a channel region of the transistor extends in the first direction; an edge of the data line adjacent to the channel region of the transistor is multiplexed as the first pole of the transistor, and the second pole of the transistor is disposed opposite the first pole of the transistor on one side of the channel region.

Optionally, in the above print recognition substrate provided by an embodiment of the present disclosure, a channel region of the transistor is in an inverted L-shape, the first pole of the transistor is integrated with the data line, and the first pole of the transistor is on a side of the data line close to the channel region of the transistor; the second pole of the transistor extends from a side of the first pole of the transistor away from the gate line to a side of the first pole of the transistor away from the data line.

Optionally, in the above print recognition substrate provided by an embodiment of the present disclosure, the channel region of the transistor is in a horizontal U-shape, the first pole of the transistor is integrated with the data line, and the first pole of the transistor is on a side of the data line close to the photoelectric conversion structure; the second pole of the transistor extends from a side of the first pole of the transistor away from the gate line, through a side of the first pole of the transistor away from the data line, to a side of the first pole of the transistor close to the gate line.

Optionally, the above print recognition substrate provided by an embodiment of the present disclosure further includes: a light shielding portion located on a side of the photoelectric conversion structure away from the base substrate; and an orthographic projection of the light shielding portion on the base substrate covers at least an orthographic projection of the channel region of the transistor on the base substrate.

Optionally, in the above print recognition substrate provided by an embodiment of the present disclosure, the orthographic projection of the light shielding portion on the base substrate covers the orthographic projection of the transistor and the orthographic projection of the gate line on the base substrate.

Optionally, the above print recognition substrate provided by an embodiment of the present disclosure further includes a bias line positioned between a layer where the light shielding portion is located and a layer where the photoelectric conversion structure is located, and the bias line is in direct contact with the light shielding portion.

Optionally, the above print recognition substrate provided by an embodiment of the present disclosure further includes a third electrode located between a layer where the light shielding portion is located and a layer where the photoelectric conversion structure is located; and the third electrode is electrically connected to the bias line, the third electrode is stacked with the photoelectric conversion structure, and the second electrode, the photoelectric conversion structure, and the third electrode which are stacked constitute a photo sensor.

Optionally, the above print recognition substrate provided by an embodiment of the present disclosure further includes an absorption type cut-off film on a side of the layer where the light shielding portion is located away from the base substrate, wherein the absorption type cut-off film selectively transmits blue light.

Optionally, in the above print recognition substrate provided by an embodiment of the present disclosure, a material of the absorption type cut-off film is one or a combination of blue resin or blue ink.

Optionally, the above print recognition substrate provided by an embodiment of the present disclosure further includes an optical fiber layer on a side of the absorption type cut-off film away from the base substrate.

Optionally, the above print recognition substrate provided by an embodiment of the present disclosure further includes an electrostatic release electrode layer on a side of the fiber layer away from the base substrate, wherein the electrostatic release electrode layer is grounded.

Optionally, in the above print recognition substrate provided by an embodiment of the present disclosure further includes a hard coating on a side of the electrostatic release electrode layer away from the base substrate.

Optionally, in the above print recognition substrate provided by an embodiment of the present disclosure, a material of the hard coating is one or a combination of silicon oxide, or silicon carbide.

Optionally, the above print recognition substrate provided by an embodiment of the present disclosure further includes an anti-fingerprint film on a side of the hard coating facing away from the base substrate.

In another aspect, embodiments of the present disclosure also provide a print recognition apparatus, including a backlight module and a print recognition substrate, the print recognition substrate is the print recognition substrate mentioned above, and the print recognition substrate is on a light-emitting side of the backlight module.

Optionally, the above print recognition apparatus provided by an embodiment of the present disclosure further includes a driver chip on a side of the backlight module away from the print recognition substrate, and the driver chip is electrically connected to the backlight module and the print recognition substrate, respectively.

Optionally, the above print recognition apparatus provided by an embodiment of the present disclosure further includes a housing that encloses the driver chip, the backlight module, and the print recognition substrate, and is in contact with an edge of the print recognition substrate on a side of the print recognition substrate away from the backlight module.

Optionally, in the above print recognition apparatus provided by an embodiment of the present disclosure, a sum of thicknesses of the housing, the backlight module, and the print recognition substrate in a direction directed by the backlight module toward the print recognition substrate ranges from 6 mm to 10 mm.

DETAILED DESCRIPTION OF THE EMBODIMENTS

Figure 1:
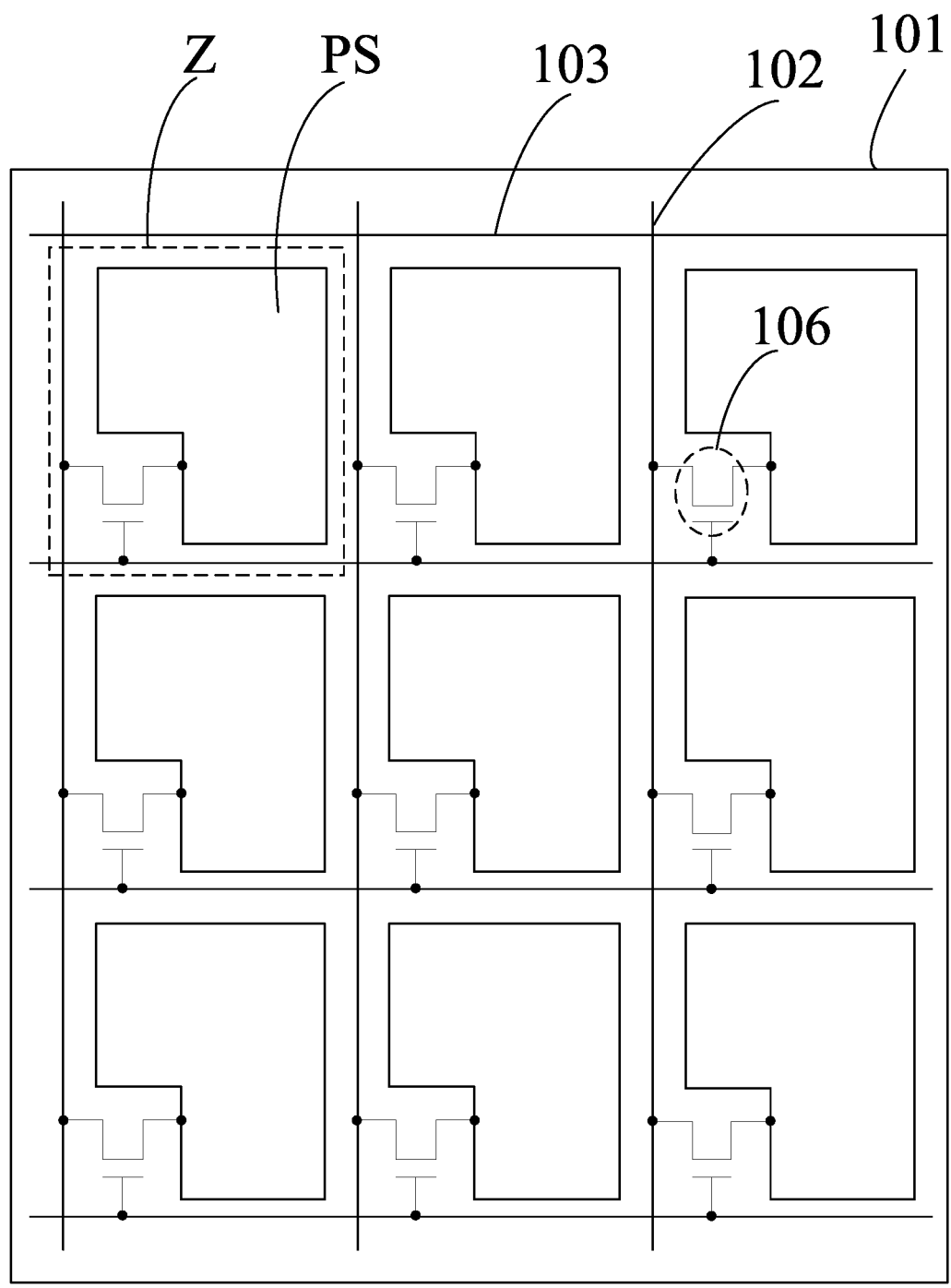
FIG. 1 is a structural schematic diagram of a print recognition substrate according to an embodiment of the present disclosure.

In order to make objectives, technical solutions and advantages of the embodiments of the disclosure clearer, the technical solutions of the embodiments of the disclosure are described clearly and completely below with reference to the drawings of the embodiments of the disclosure. It should be noted that sizes and shapes of all figures in the drawings do not reflect a true scale and are only intended to illustrate contents of the disclosure. Same or similar reference numbers denote same or similar elements or elements with same or similar functions all the time.

Unless otherwise defined, technical or scientific terms used herein shall have the ordinary meaning as understood by those of ordinary skill in the art to which the present disclosure belongs. "First", "second" and similar words used in the specification and the claims of the present disclosure do not represent any order, quantity, or importance, but are merely used to distinguish different components. "Include" or "comprise" and other similar words mean that an element or an item preceding the word cover elements or items and their equivalents listed after the word without excluding other elements or items. "Inner", "outer", "upper", "lower", etc. are only used to indicate a relative positional relationship, and when an absolute position of a described object changes, the relative positional relationship may also change accordingly.

Optical fingerprint recognition is one of the means to achieve fingerprint recognition, the principle of optical fingerprint recognition is as follows: when a finger is placed over a fingerprint recognition product, the light emitted from a backlight included in the fingerprint recognition product is emitted to valleys and ridges of the finger and then is reflected by the valleys and ridges of the finger to be incident on a photo sensor (PS) included in the fingerprint recognition product. Since the intensities of light reflected by the valley and ridge positions are different, the photo sensor (PS) generates different electrical signals depending on the difference in intensities of the reflected light described above, enabling fingerprint recognition.

Because the backlight is positioned below the photoelectric conversion structure, the light emitted from the backlight may be directly emitted to the photoelectric conversion structure without reflection by the finger, thereby affecting the effect of fingerprint recognition.

Figure 2:
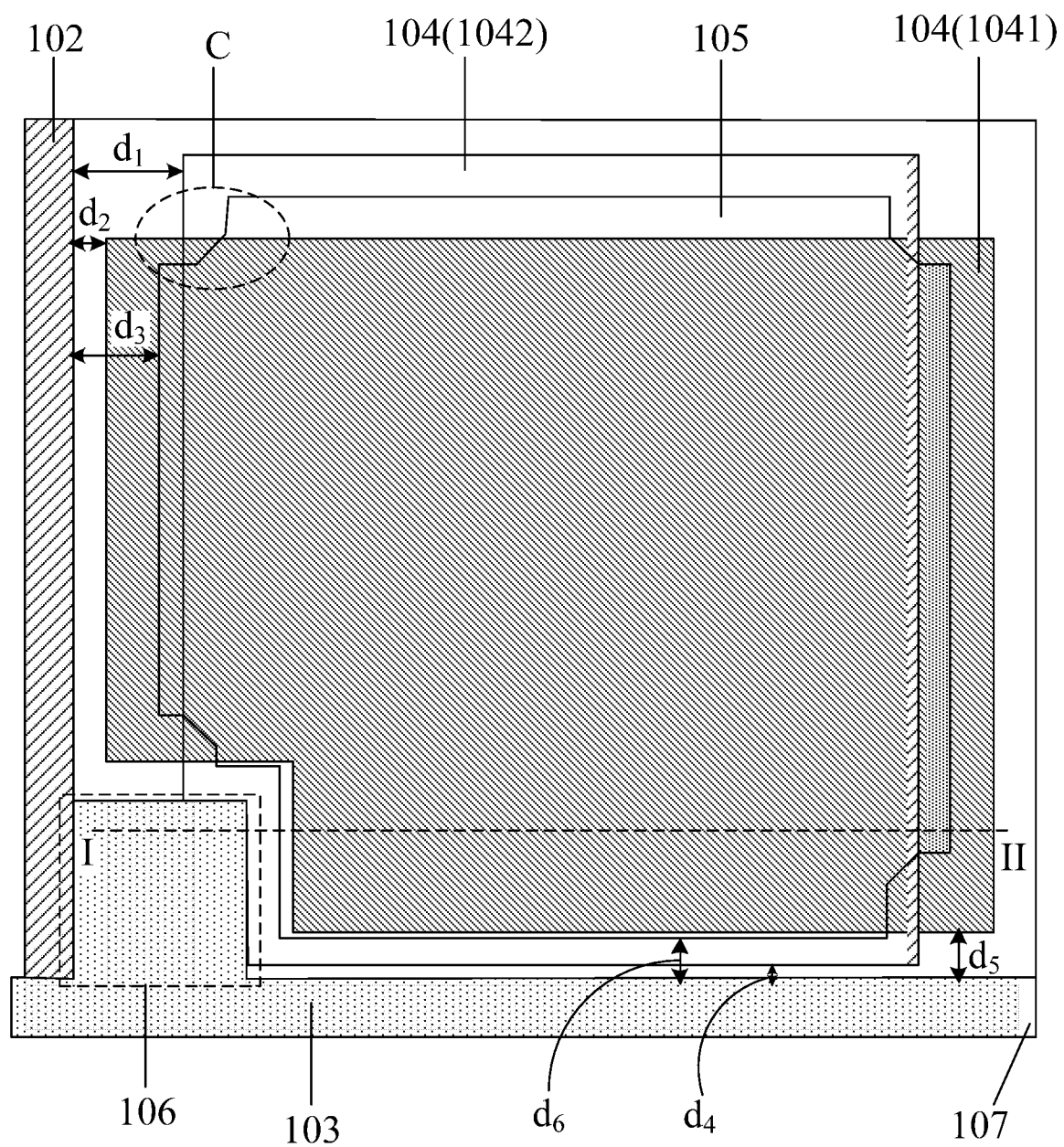
FIG. 2 is a schematic diagram of an enlarged structure of a Z region of FIG. 1.
Figure 3:
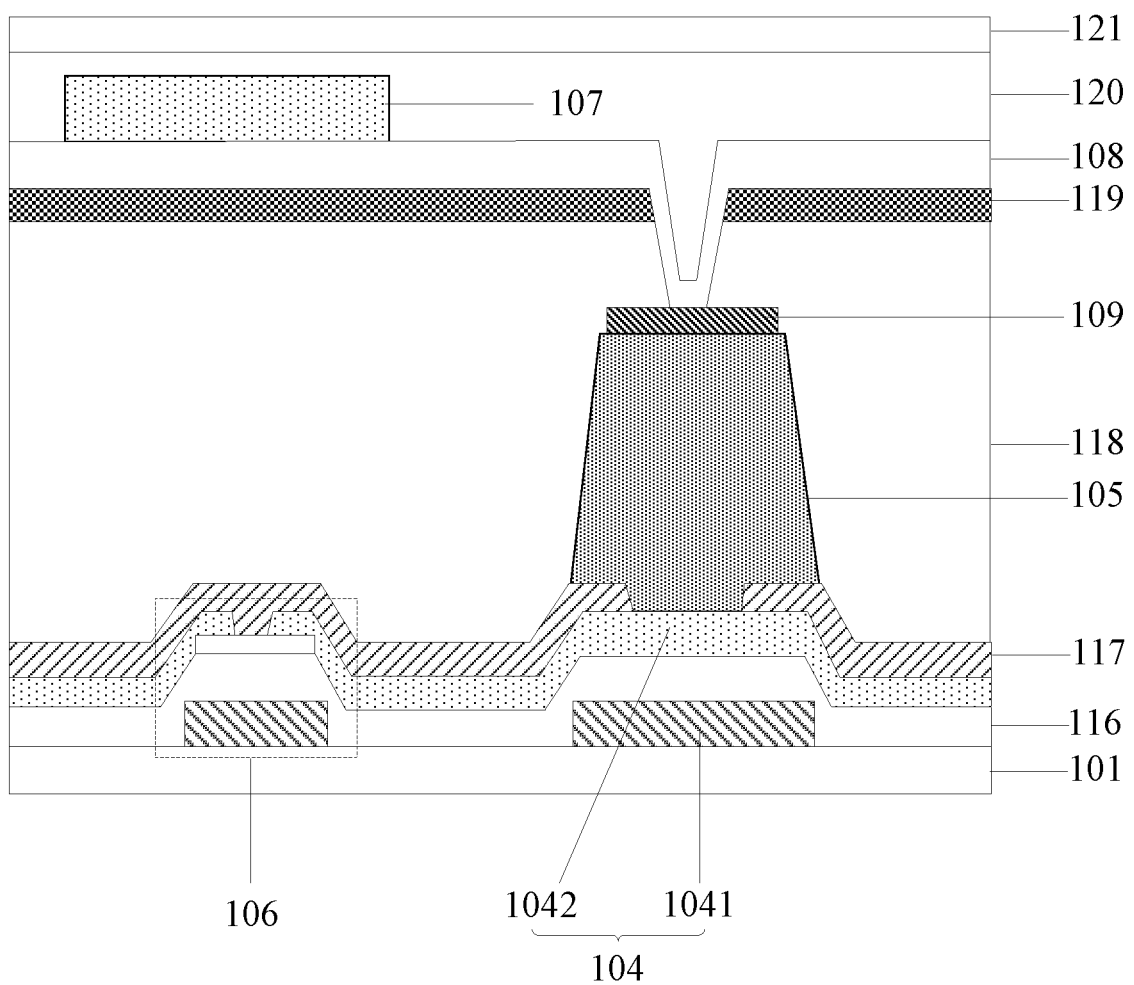
FIG. 3 is a schematic diagram of a cross-sectional structure along a line I-II of FIG. 2.

To address at least the above technical problems existing in the related art, embodiments of the present disclosure provide a print recognition substrate, as shown in FIGS. 1 to 3, that may include: a base substrate 101, which includes a data line 102 and gate line 103 crossing each other; a light shielding structure 104, located on the base substrate 101, and including at least one metal layer, wherein an orthographic projection of the light shielding structure 104 on the base substrate 101 does not overlap with orthographic projections of the data line 102 and the gate line 103 on the base substrate 101; a photoelectric conversion structure 105, located on the side of the light shielding structure 104 away from the base substrate 101, an orthographic projection of the photoelectric conversion structure 105 on the base substrate 101 being located in the orthographic projection of the light shielding structure 104 on the base substrate 101, and a distance between an edge of the photoelectric conversion structure 105 and an edge of the light shielding structure 104 being less than or equal to 3 μm.

By disposing the light shielding structure 104 under the photoelectric conversion structure 105 and completely blocking the photoelectric conversion structure 105 by the light shielding structure 104 in the above-described print recognition substrate provided by an embodiment of the present disclosure, the light emitted from the backlight is prevented from being directly emitted to the photoelectric conversion structure 105 to interfere with fingerprint recognition.

Figure 4:
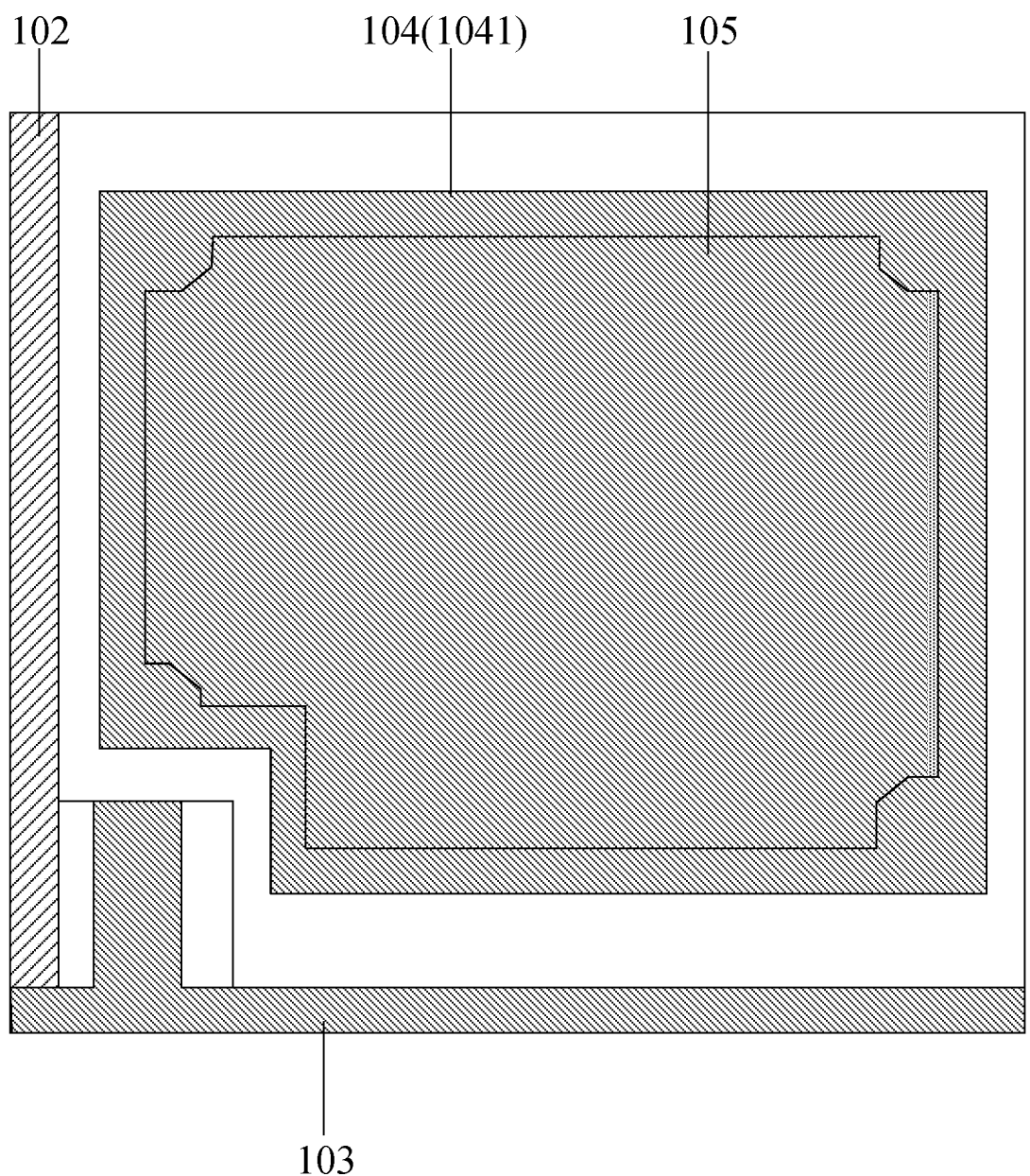
FIG. 4 is a schematic diagram of another enlarged structure of the Z region of FIG. 1.
Figure 5:
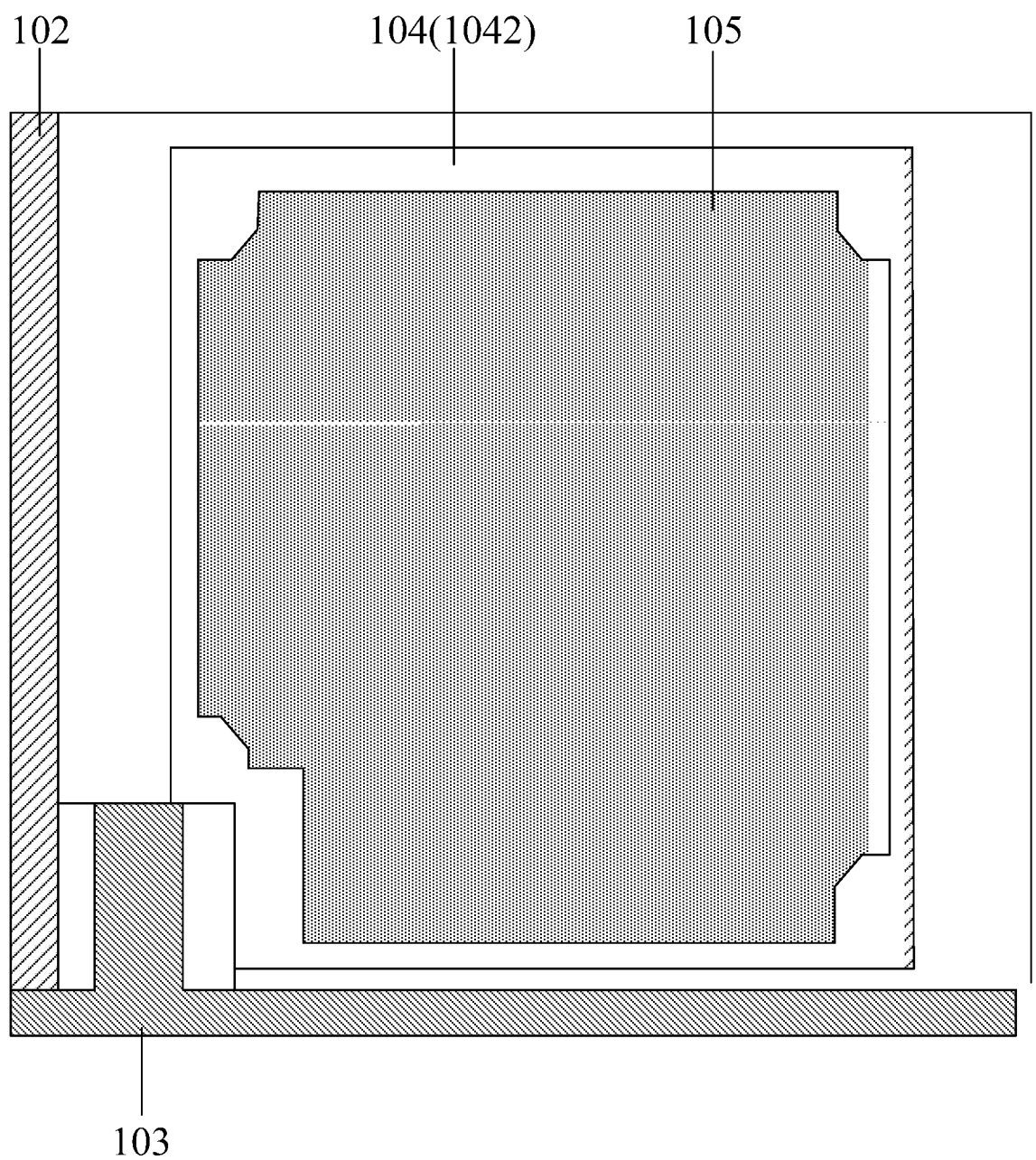
FIG. 5 is a schematic diagram of another enlarged structure of the Z region of FIG. 1.

In some embodiments, in the above print recognition substrate provided by an embodiment of the present disclosure, as shown in FIG. 4, the light shielding structure 104 can include a first electrode 1041, which can be in the same layer as gate lines 103; or, as shown in FIG. 5, the light shielding structure 104 may include a second electrode 1042 that is in the same layer as the data lines 102.

By providing the light shielding structure 104 including the first electrode 1041 in the same layer as the gate lines 103, or providing the second electrode 1042 in the same layer as the data lines 102, the light emitted from the backlight is effectively prevented from being directly emitted to the photoelectric conversion structure 105, and the light shielding structure 104 can be prevented from being fabricated separately, thereby improving the production efficiency and reducing the number of film lays.

In some embodiments, in the above print recognition substrate provided by an embodiment of the present disclosure, as shown in FIG. 2, the light shielding structure 104 may include a first electrode 1041 and a second electrode 1042, wherein the first electrode 1041 is in the same layer as the gate lines 103, the second electrode 1042 is in the same layer as the data lines 102, and in an extending direction of the gate lines 103, an orthographic projection of an edge of the photoelectric conversion structure 105 on the base substrate 101 is located in an orthographic projection of the first electrode 1041 on the base substrate 101, and in an extending direction of the data lines 102, an orthographic projection of the edge of the photoelectric conversion structure 105 on the base substrate 101 is located in an orthographic projection of the second electrode 1042 on the base substrate 101.

Since the second electrode 1042 and the data line 102 are in the same layer, to avoid direct contact of the data line 102 with the second electrode 1042, the size of the second electrode 1042 may only be increased as much as possible in the extending direction of the data line 102; on this basis, the size of the photoelectric conversion structure 105 blocked by the second electrode 1042 in the extending direction of the data line 102 may be increased as much as possible. In addition, since the first electrode 1041 is in the same layer as the gate line 103, the size of the first electrode 1041 may only be increased as much as possible in the extending direction of the gate line 103 in order to avoid direct contact of the gate line 103 with the first electrode 1041; on this basis, the size of the photoelectric conversion structure 105 blocked by the first electrode 1041 in the extending direction of the gate line 103 may be increased as much as possible. In other words, by jointly blocking the photoelectric conversion structure 105 with the first electrode 1041 and the second electrode 1042 in the present disclosure, the area of the photoelectric conversion structure 105 can be guaranteed to be maximized, and thus the sensitivity and accuracy of print recognition (e.g., fingerprints, palm prints, etc.) can be greatly improved.

In some embodiments, in the above print recognition substrate provided by an embodiment of the present disclosure, to ensure that the photoelectric conversion structure 105 can be completely blocked by the second electrode 1042 and the first electrode 1041, both ends of an edge of the photoelectric conversion structure 105 close to the data line 102 and both ends of an edge of the photoelectric conversion structure 105 away from the data line 102 are provided with chamfers C recessed toward the center of the photoelectric conversion structure 105 as shown in FIG. 2. Optionally, the chamfer C may be in the shape of a fold line as shown in FIG. 2, or may be in the shape of an arc, which is not particularly limited herein.

In some embodiments, in the above print recognition substrate provided by an embodiment of the present disclosure, in order to maximize the area of the photoelectric conversion structure 105 while guaranteeing a blocking effect, it is possible to provide that the maximum distance between an edge of the chamfer C and an edge of the first electrode 1041 is not less than 0 μm to 3 μm and the maximum distance between an edge of the chamfer C and an edge of the second electrode 1042 is not less than 0 μm to 3 μm.

In some embodiments, in the above print recognition substrate provided by an embodiment of the present disclosure, in order to take into account the size of the photoelectric conversion structure 105 in the extending direction of the data line 102 and the light shielding effect of the second electrode 1042 on the photoelectric conversion structure 105, the orthographic projection of the photoelectric conversion structure 105 on the base substrate 101 and the orthographic projection of the second electrode 1042 on the base substrate 101 have a first overlap area, and a ratio of the first overlap area to an area of the orthographic projection of the second electrode 1042 on the base substrate 101 ranges from 0.6 to 0.8., e.g., 0.6, 0.65, 0.7, 0.75, 0.8, etc.

In some embodiments, in the above print recognition substrate provided by an embodiment of the present disclosure, in order to take into account the size of the photoelectric conversion structure 105 in the extending direction of the gate line 103 and the light shielding effect of the first electrode 1041 on the photoelectric conversion structure 105, the orthographic projection of the photoelectric conversion structure 105 on the base substrate 101 and the orthographic projection of the first electrode 1041 on the base substrate 101 have a second overlap area, and a ratio of the second overlap area to an area of the orthographic projection of the first electrode 1041 on the base substrate 101 ranges from 0.7 to 0.9., e.g., 0.7, 0.75, 0.8, 0.85, 0.9, etc.

In some embodiments, in the above print recognition substrate provided by an embodiment of the present disclosure, the orthographic projection of the first electrode 1041 on the base substrate 101 and the orthographic projection of the second electrode 1042 on the base substrate 101 have a third overlap area, and a ratio of the third overlap area to the area of the orthographic projection of the second electrode 1042 on the base substrate 101 ranges from 0.5 to 0.8, e.g., 0.5, 0.55, 0.6, 0.65, 0.7, 0.75, 0.8, etc.; and a ratio of the third overlap area to the area of the orthographic projection of the first electrode 1041 on the base substrate 101 ranges from 0.6-0.8, e.g., 0.6, 0.65, 0.7, 0.75, 0.8, etc.

Due to the larger overlap area between the second electrode 1042 and the first electrode 1041, parasitic capacitance is created between the two, in some embodiments, the first electrode 1041 can be loaded with a fixed potential bias voltage (Bias) to prevent the first electrode 1041 from interfering with the signal on the second electrode 1042.

In some embodiments, in the above print recognition substrate provided by an embodiment of the present disclosure, as shown in FIG. 2, the minimum distance between the second electrode 1042 and the data line 102 is a first distance $d_1$, a second distance $d_2$ is between an orthographic projection of the first electrode 1041 on the base substrate 101 and an orthographic projection of the data line 102 on the base substrate 101, and a minimum distance between an orthographic projection of the photoelectric conversion structure 105 on the base substrate 101 and an orthographic projection of the data line 102 on the base substrate 101 is a third distance $d_3$, which may be greater than the second distance $d_2$ and may be less than the first distance $d_1$.

Within the limit range of meeting the process, the relationship between the data line 102 and the second electrode 1042, the first electrode 1041 as well as the photoelectric conversion structure 105 satisfies that the third distance $d_3$ is greater than the second distance $d_2$ and less than the first distance $d_1$, the areas of the second electrode 1042 and the first electrode 1041 can be maximized, and thus a maximum area, blocked by the second electrode 1042 and the first electrode 1041, of the photoelectric conversion structure 105 can be guaranteed, whereby sensitivity and accuracy of print recognition (e.g., fingerprints, palm prints, etc.) can be improved. Additionally, a second distance $d_2$ is between the orthogonal projection of the first electrode 1041 on the base substrate 101 and the orthogonal projection of the data line 102 on the base substrate 101, which may effectively avoid parasitic capacitance between the first electrode 1041 and the data line 102 from interfering with the signal on the data line 102.

In some embodiments, a first distance $d_1$ is between the second electrode 1042 and the data line 102, a second distance $d_2$ is between the orthographic projection of the first electrode 1041 on the base substrate 101 and the orthographic projection of the data line 102 on the base substrate 101, a third distance $d_3$ between the orthographic projection of the photoelectric conversion structure 105 on the base substrate 101 and the orthographic projection of the data line 102 on the base substrate 101 may satisfy: $d_1:d_2:d_3$ ranges from 5:2:3 to 5:2:4.9. Optionally, the first distance $d_1$ between the second electrode 1042 and the data line 102 may range from 7 μm to 9 μm, e.g., 7 μm, 7.5 μm, 8 μm, 8.5 μm, 9 μm, etc.; the second distance $d_2$ between the orthographic projection of the first electrode 1041 on the base substrate 101 and the orthographic projection of the data line 102 on the base substrate 101 may range from 3 μm to 5 μm, e.g., 3 μm, 3.5 μm, 4 μm, 4.5 μm, 5 μm etc.; the third distance $d_3$ between an orthographic projection of the photoelectric conversion structure 105 on the base substrate 101 and an orthographic projection of the data line 102 on the base substrate 101 may range from 5 μm to 7 μm, e.g., 5 μm, 5.5 μm, 6 μm, 6.5 μm, 7 μm, etc.

In some embodiments, in the above print recognition substrate provided by an embodiment of the present disclosure, as shown in FIG. 2, a minimum distance between an orthographic projection of the second electrode 1042 on the base substrate 101 and an orthographic projection of the gate line 103 on the base substrate 101 is a fourth distance $d_4$, a minimum distance between the first electrode 1041 and the gate line 103 is a fifth distance $d_5$, and a minimum distance between the orthographic projection of the photoelectric conversion structure 105 on the base substrate 101 and an orthographic projection of the gate line 103 on the base substrate 101 is a sixth distance $d_6$, the sixth distance $d_6$ being greater than the fourth distance $d_4$ and less than the fifth distance $d_5$.

Since both the first electrode 1041 and the gate line 103 are arranged in the second metal layer, in order to avoid shorting the first electrode 1041 and the gate line 103, a slightly larger fifth distance ds between the first electrode 1041 and the gate line 103 is provided. With this premise, the area of the second electrode 1042 may be increased as much as possible to guarantee that the area of the photoelectric conversion structure 105 jointly blocked by the second electrode 1042 and the first electrode 1041 is maximized. In addition, the fourth distance $d_4$ between the orthographic projection of the second electrode 1042 on the base substrate 101 and the gate line 103 can effectively prevent parasitic capacitance between the second electrode 1042 and the gate line 103 from interfering with the signal on the gate line 103.

It should be noted that the light emitted from the backlight passes through the area where the first distance $d_1$, the second distance $d_2$, the fourth distance $d_4$, and the fifth distance $d_5$ are located to reach the finger and is reflected by the finger and then converted to an electrical signal by the photoelectric conversion structure 105 for fingerprint recognition. Due to the large luminance adjustable space of the backlight, therefore, the light transmittance is not a major factor limiting the fingerprint recognition effect, in other words, the first distance $d_1$, the second distance $d_2$, the fourth distance $d_4$, and the fifth distance $d_5$ may be minimized under conditions allowed by the fabrication process, and by increasing the luminance of the backlight, it is ensured that the backlight provides sufficiently strong emitted light for fingerprint recognition. In combination with the area maximized photoelectric conversion structure 105 provided in the present disclosure, more obvious electrical signals can be obtained, thereby improving the effectiveness of fingerprint recognition.

In some embodiments, the fourth distance $d_4$ between the orthographic projection of the second electrode 1042 on the base substrate 101 and the orthographic projection of the gate line 103 on the base substrate 101, the fifth distance $d_5$ between the first electrode 1041 and the gate line 103, and a sixth distance $d_6$ between the orthographic projection of the photoelectric conversion structure 105 on the base substrate 101 and the orthographic projection of the gate line 103 on the base substrate 101 may satisfy: $d_4:d_5:d_6$ ranges from 2:6:5 to 2:6:4. Optionally, the fourth distance $d_4$ between the orthographic projection of the second electrode 1042 on the base substrate 101 and the orthographic projection of the gate line 103 on the base substrate 101 may range from 2 μm to 5 μm, e.g., 2 μm, 2.5 μm, 3 μm, 3.5 μm, 4 μm, 4.5 μm, 5 μm etc.; the fifth distance $d_5$ between the first electrode 1041 and the gate line 103 can range from 7 μm to 9 μm, e.g., 7 μm, 7.5 μm, 8 μm, 8.5 μm, 9 μm, etc.; the sixth distance $d_6$ between the orthographic projection of the photoelectric conversion structure 105 on the base substrate 101 and the orthographic projection of the gate line 103 on the base substrate 101 may range from 5 μm to 7 μm, e.g., 5 μm, 5.5 μm, 6 μm, 6.5 μm, 7 μm, etc.

In some embodiments, the first electrode 1041, the second electrode 1042, the gate line 103, and the data line 102 may be fabricated from molybdenum, aluminum, silver, copper, titanium, platinum, tungsten, tantalum, tantalum nitride, alloys thereof, combinations thereof, or other suitable materials. The photoelectric conversion structure 105 may be a PN structure or may be a PIN structure. Specifically, the PIN structure includes an N-type semiconductor layer having an N-type impurity, an intrinsic semiconductor layer I having no impurity, and a P-type semiconductor layer having a P-type impurity stacked sequentially on the second electrode 1042; the thickness of the intrinsic semiconductor layer I may be greater than the thickness of the P-type semiconductor layer and the thickness of the N-type semiconductor layer.

In some embodiments, in the above print recognition substrate provided by an embodiment of the present disclosure, as shown in FIG. 2, a transistor 106 may also be included, the gate of the transistor 106 being in the same layer as the gate line 103, a first pole of the transistor 106 and a second pole of the transistor 106 being in the same layer as the data line 102; the gate of the transistor 106 is electrically connected to the gate line 103, a first pole of the transistor 106 is electrically connected to the data line 102, and a second pole of the transistor 106 is electrically connected to the second electrode 1042; and the orthographic projection of the transistor 106 on the base substrate 101 does not overlap with the orthographic projection of the photoelectric conversion structure 105 on the base substrate 101 and the orthographic projection of the first electrode 1041 on the base substrate 101 to avoid parasitic capacitance between the transistor 106 and the first electrode 1041.

Figure 6:
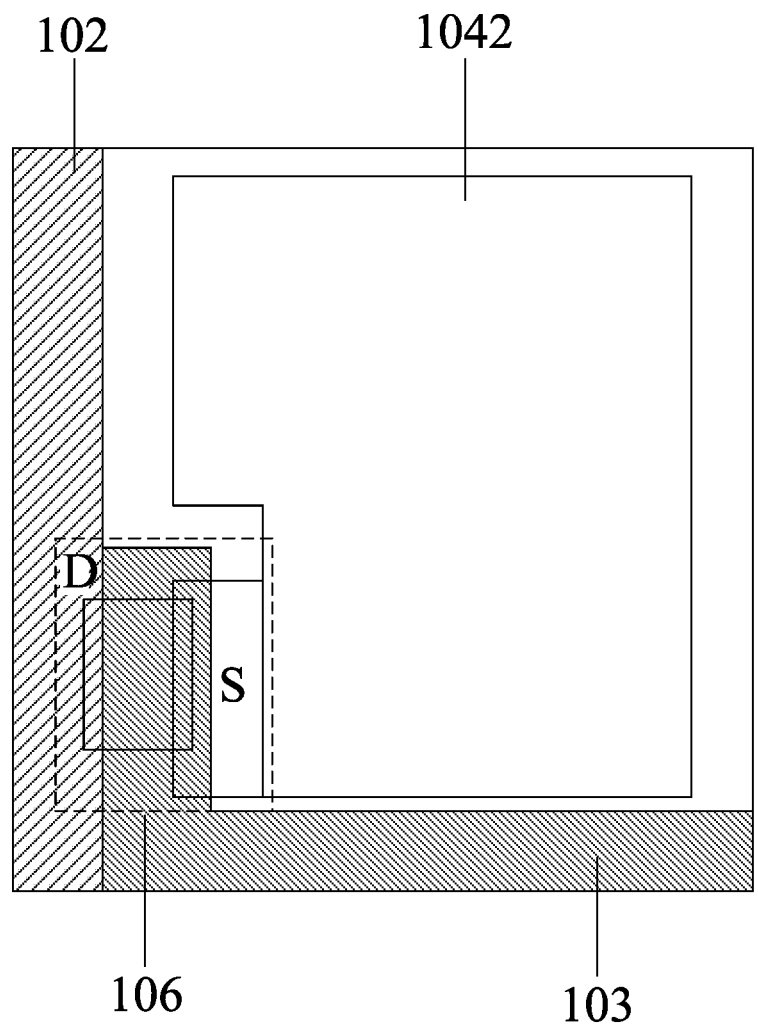
FIG. 6 is a structural schematic diagram of a transistor according to an embodiment of the present disclosure.

In some embodiments, in the above described print recognition substrate provided by an embodiment of the present disclosure, to simplify the fabrication process of the transistor 106, as shown in FIG. 6, the channel region of the transistor 106 is in the form of "1" extending along the extending direction of the data line 102; an edge, adjacent to the channel region of the transistor 106, of the data line 102 is multiplexed as a first pole D of the transistor 106, a second pole S of the transistor 106 is disposed opposite the first pole D of the transistor 106 on one side of the channel region.

Figure 7:
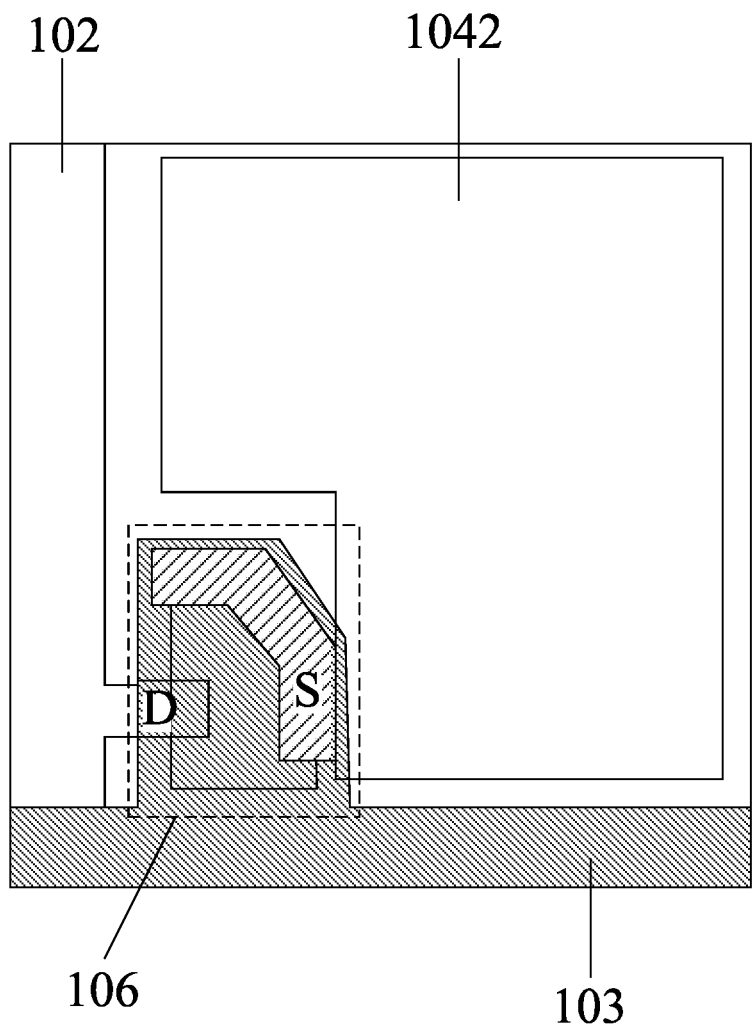
FIG. 7 is another structural schematic diagram of the transistor according to an embodiment of the present disclosure.

In some embodiments, in the above print recognition substrate provided by an embodiment of the present disclosure, the channel region of the transistor 106 is in an inverted "L" shape as shown in FIG. 7, the first pole D of the transistor 106 is integrated with the data line 102, and the first pole D of the transistor 106 is on a side of the data line 102 close to the channel region 07 of the transistor; the second pole S of the transistor 106 extends from the side of the first pole D of the transistor 106 away from the gate line 103 to the side of the first pole D of the transistor 106 away from the data line 102. Such design may reduce the capacitance of the transistor 106 in the extending direction of the data line 102, thereby reducing noise.

Figure 8:
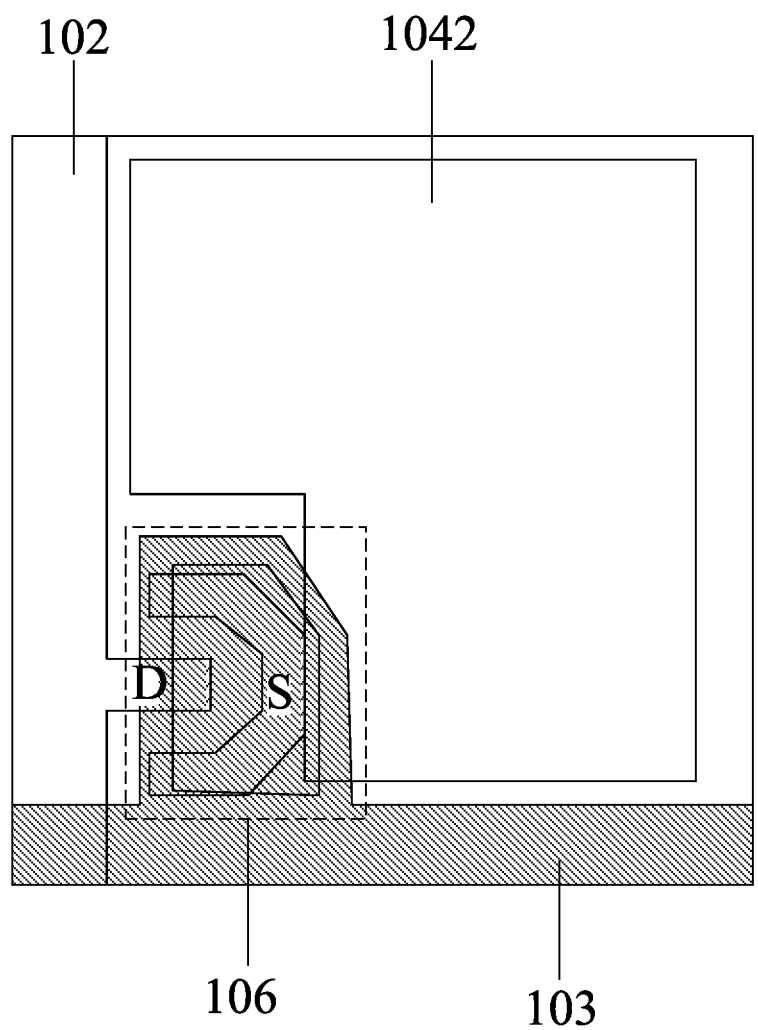
FIG. 8 is yet another structural schematic diagram of the transistor according to an embodiment of the present disclosure.

In some embodiments, in the above print recognition substrate provided by an embodiment of the present disclosure, as shown in FIG. 8, the channel region of the transistor 106 is in a horizontal "U" shape, the first pole D of the transistor 106 is integrated with the data line 102, and the first pole D of the transistor 106 is located on a side of the data line 102 close to the photoelectric conversion structure 105; the second pole S of the transistor 106 extends from a side of the first pole D of the transistor 106 away from the gate line 103 to a side of the first pole D of the transistor 106 close the gate line 103 through the side of the first pole D of the transistor 106 away from the data line 102. This design may ensure that the channel width-to-length ratio of the transistor 106 is large.

It should be noted that only three designs of the transistor 106 in the present disclosure have been illustrated above, and other designs known to those skilled in the art may be used for the transistor 106 in particular implementation, and are not limited herein.

In some embodiments, the above-described print recognition substrate provided by an embodiment of the present disclosure, as shown in FIGS. 2 and 3, may further include: a light shielding portion 107, which may be located on a side of a layer where the photoelectric conversion structure 105 is located away from the base substrate 101; the orthographic projection of light shielding portion 107 on base substrate 101 at least covers the orthographic projection of the channel region of transistor 106 on base substrate 101 to effectively avoid the effect of ambient light rays on the channel region, thus improving the signal-to-noise ratio.

In some embodiments, in the above print recognition substrate provided by an embodiment of the present disclosure, as shown in FIGS. 2 and 3, an orthographic projection of the light shielding portion 107 on base substrate 101 covers the orthographic projections of the transistor 106 and the gate line 103 on base substrate 101, such that the light shielding portion 107 may effectively block outside light rays that are perpendicularly incident and laterally incident to the transistor 106, thereby realizing omni-directional protection of the transistor 106.

In some embodiments, in the above-described print recognition substrate provided by an embodiment of the present disclosure, as shown in FIGS. 2 and 3, a bias line 108 may be further included, the bias line 108 may be located between a layer where the light shielding portion 107 is located and a layer where the photoelectric conversion structure 105 is located, and the bias line 108 may be in direct contact with the light shielding portion 107.

The bias line 108 is typically an indium tin oxide (ITO) layer disposed in the whole surface, and thus the resistance of the bias line 108 is large, and placing the light shield 107 in direct contact may effectively reduce the resistance of the bias line 108 disposed in the whole surface, which are particularly suitable for large-sized print recognition products.

In some embodiments, in the above print recognition substrate provided by an embodiment of the present disclosure, as shown in FIG. 3, a third electrode 109 may be further included, and the third electrode 109 may be located between a layer where the light shielding portion 107 is located and a layer where the photoelectric conversion structure 105 is located; and the third electrode 109 is electrically connected to the bias line 108 to load the third electrode 109 with a bias voltage through the bias line 108; the third electrode 109 is stacked with the photoelectric conversion structure 105, and the second electrode 1042, the photoelectric conversion structure 105, and the third electrode 109 which are stacked constitute the photo sensor (PS).

Figure 9:
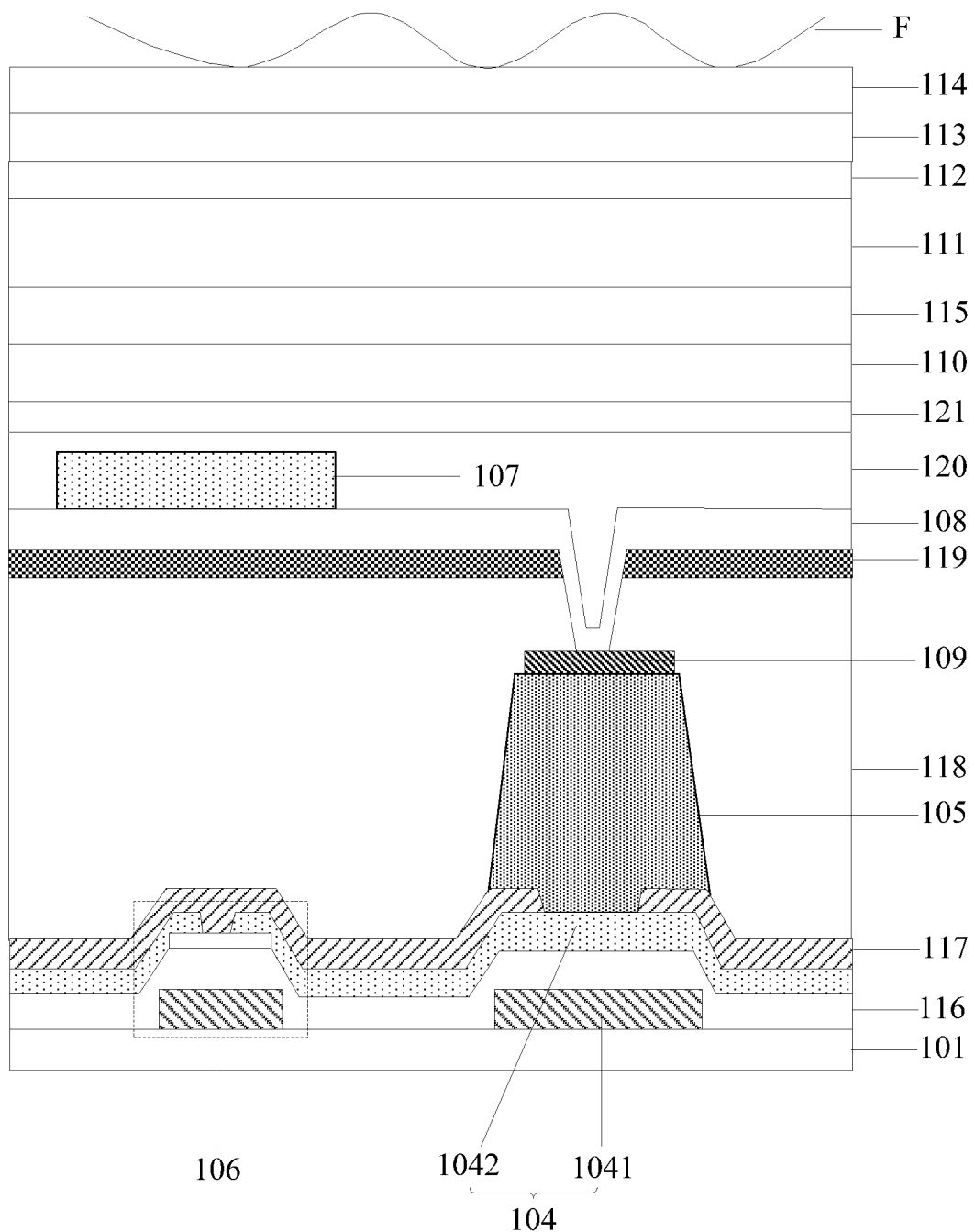
FIG. 9 is a schematic diagram of another cross-sectional structure along the line I-II of FIG. 2.

In some embodiments, the above-described print recognition substrate provided by an embodiment of the present disclosure may further include, as illustrated in FIG. 9, an absorption type cut-off film 110, an optical fiber layer 111, an electrostatic release electrode layer 112, a hard coating 113, and an anti-fingerprint film (AF) 114 stacked sequentially on a side of the layer where the light shielding portion 107 is located away from the base substrate 101.

It should be noted that, the wavelength of light transmitted by the absorption type cut-off film 110 needs to be consistent with the emission wavelength of the light source, and a blue light source with greater light intensity is preferred in the present disclosure, and accordingly, the absorption type cut-off film 110 selectively transmits blue light and light of other wavelengths is cut-off, and preferably, the transmittance of the absorption type cut-off film 110 at the cut-off wavelength can be less than 3%. In some embodiments, the absorption type cut-off film 110 can use a blue resin, a blue ink, or the like, and there is no clear definition of the material in the present disclosure as long as the transmittance is guaranteed to meet the requirements.

Additionally, the optical fiber layer 111 may increase the hardness of the product. In specific implementation, the absorption type cut-off film 110 can be attached to the optical fiber layer 111 by an optically clear adhesive (OCA) 115. Optionally, the thickness of the optically clear adhesive 115 may be less than 25 μm. The electrostatic discharge electrode layer 112 may be grounded to improve the anti-electro-static discharge (ESD) capability of the product. Optionally, the electrostatic discharge electrode layer 112 may be fabricated from transparent materials such as indium tin oxide (ITO) or indium zinc oxide (IZO) to improve light transmission efficiency. In specific implementation, the hard coating 113 may be made using silicon oxide ($SiO_2$), silicon carbide (SiC), or a combination thereof, which enables the overall hardness of the product to 9 H, greatly enhancing the scratch resistance of the product. Since fingers need to touch the surface of the product repeatedly, fingerprint residue will affect fingerprint collection, so an anti-fingerprint film 114 can be plated on the outermost surface of the product to prevent fingerprint residue and improve fingerprint collection effect.

Generally, the above-described print recognition substrate provided by an embodiment of the present disclosure, as shown in FIGS. 3 and 9, may further include: a gate insulating layer 116, a first insulating layer 117, a first planar layer 118, a second insulating layer 119, a second planar layer 120, and a protective layer 121. Other essential components of the print recognition substrate are to be understood to be available by those of ordinary skill in the art and are not to be described herein and should not be taken as a limitation of the present disclosure.

Figure 10:
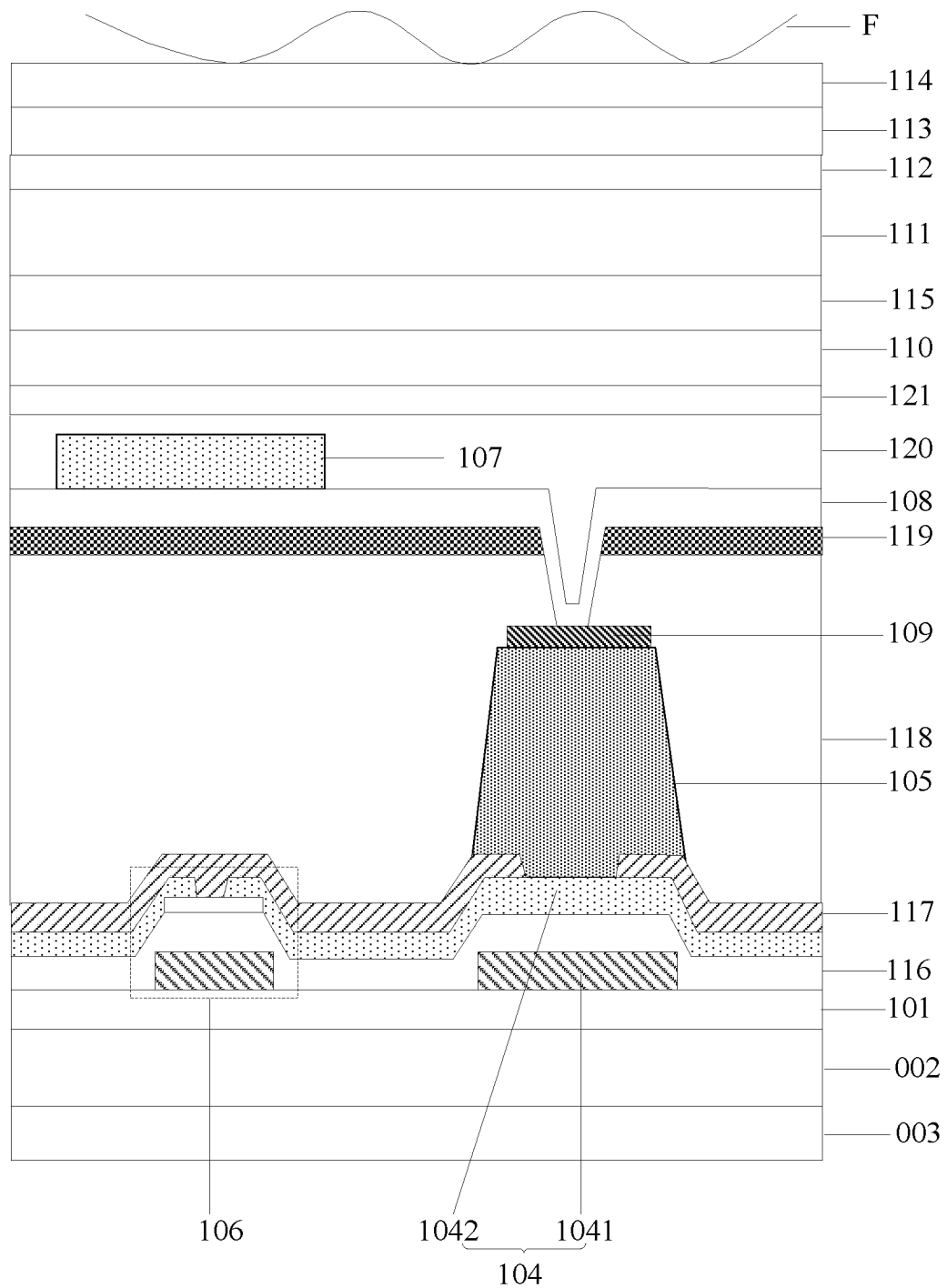
FIG. 10 is a structural schematic diagram of a print recognition apparatus according to an embodiment of the present disclosure.
Figure 11:
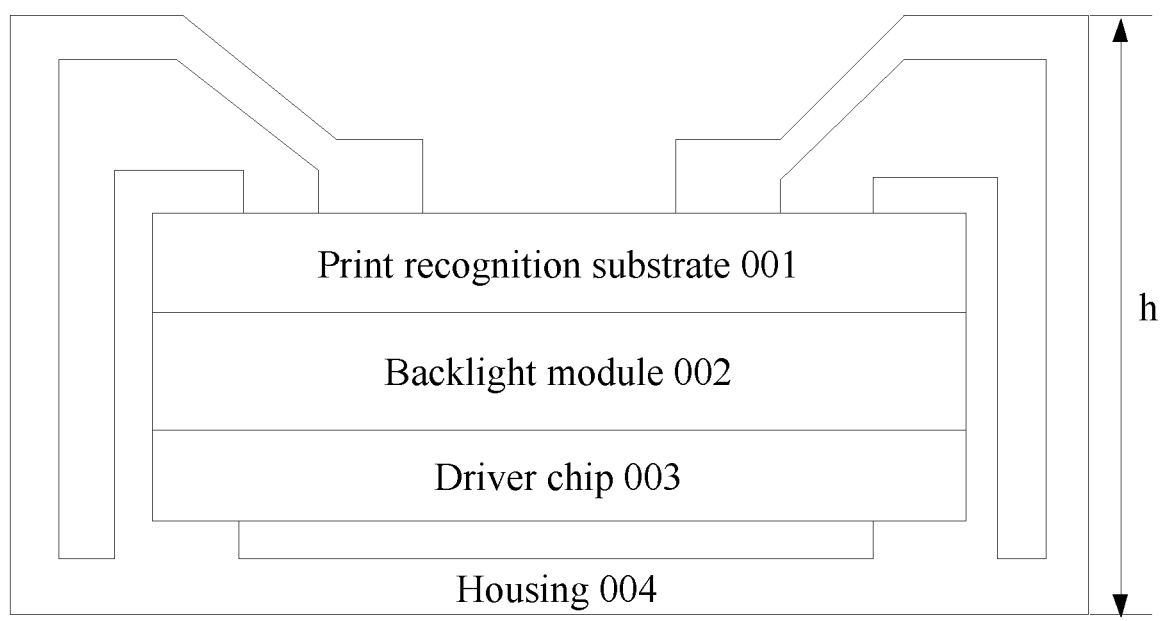
FIG. 11 is another structural schematic diagram of the print recognition apparatus according to an embodiment of the present disclosure.

According to the same inventive concept, an embodiment of the present disclosure also provides a print recognition apparatus, as shown in FIGS. 10 and 11, that may include a print recognition substrate 001 and a backlight module 002, the print recognition substrate 001 is the print recognition substrate, and the print recognition substrate 001 is on a light-emitting side of the backlight module 002.

Since the principle of solving the problem of the print recognition apparatus is similar to the principle of solving the problem of the print recognition substrate 001 described above, the implementation of the print recognition apparatus provided by the embodiments of the present disclosure can be referred to the implementation of the print recognition substrate provided by the embodiments of the present disclosure, and the repetition is not repeated.

Figure 12:
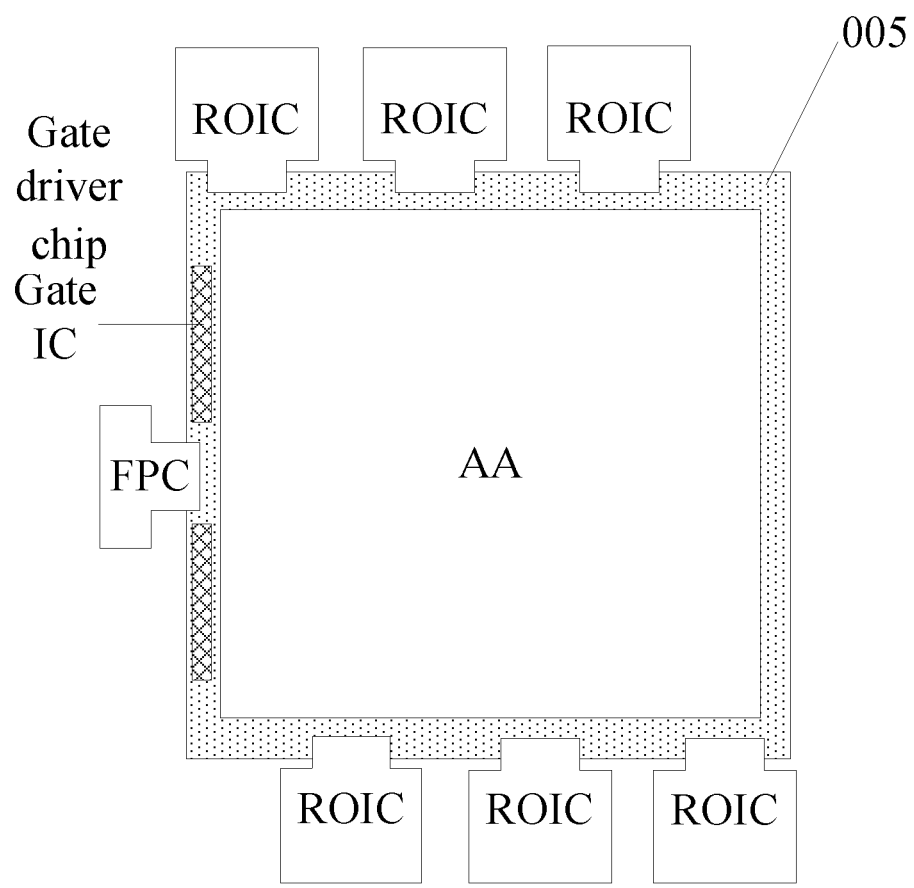
FIG. 12 is yet another structural schematic diagram of the print recognition substrate according to an embodiment of the present disclosure.

In some embodiments, the above-described print recognition apparatus provided by embodiments of the present disclosure, as shown in FIGS. 11 and 12, may further include a driver chip (FPGA) 003, which may be located on a side of the backlight module 002 away from the print recognition substrate 001, and the driver chip 003 is electrically connected to the backlight module 002 and the print recognition substrate 001, respectively. In specific implementation, the driver chip 003 controls a read-out integrated circuit (ROIC) and a gate driver chip (Gate IC) of the print recognition substrate 001 to drive the photo sensor (PS) to operate, while the backlight module 002 is also regulated by the driver chip 003 to output different light intensities. The light emitted from the backlight module 002 passes through the print recognition substrate 001 to the finger F, and the light reflected from the finger F enters the photoelectric conversion structure 105 and then is converted to an electrical signal to enable fingerprint valley-ridge recognition.

In some embodiments, the above-described print recognition apparatus provided by embodiments of the present disclosure, as shown in FIGS. 11 and 12, may further include a housing 004 which encloses the driver chip 003, the backlight module 002, and the print recognition substrate 001 to provide a protective effect on the driver chip 003, the backlight module 002, and the print recognition substrate 001. On the side of the print recognition substrate 001 away from the backlight module 002, the housing 004 is in contact with the edge of the print recognition substrate 001, i.e., a middle photo-sensitive area (AA) of the print recognition substrate 001 is in a windowed state, ensuring that the AA area receives the light reflected by the fingerprint, while also preventing interference from the surrounding ambient light. In specific implementation, the housing 004 may be fixedly bonded to the print recognition substrate 001 by a black frame adhesive 005.

In some embodiments, in the above print recognition apparatus provided by embodiments of the present disclosure, as shown in FIG. 11, a sum h of thicknesses of the housing 004, the backlight module 002, and the print recognition substrate 001 in a direction directed by the backlight module 002 to the print recognition substrate 001 may range from 6 mm to 10 mm.

Currently, prismatic optical fingerprint harvesters are commonly used in the market, after the light emitted from the backlight is emitted to the finger through the prism and then is reflected by the finger, and the light reflected by the finger is emitted to the photo sensor (PS) through the prism again for photoelectric conversion to enable fingerprint recognition, such prismatic optical fingerprint harvesters are capable of identifying fingerprints under intense light, but are bulky and inconvenient to be carried. The print recognition apparatus provided by the embodiments of the present disclosure has a thickness from 6 mm to 10 mm, which is 10 times less than the thickness of prior prismatic optical fingerprint harvesters, and has portability. In addition, the luminance adjustable space of the backlight module 002 and the area of the photoelectric conversion structure 105 are large in this disclosure, and thus the above-described print recognition apparatus provided in this disclosure can also perform print recognition under high light conditions such as outdoors.

Apparently, those skilled in the art can make various changes and transformations to the embodiments of the disclosure without departing from the spirit and the scope of the embodiments of the disclosure. In this case, if these changes and transformations of the embodiments of the disclosure fall within the scope of the claims and their equivalents of the disclosure, the disclosure also intends to include these changes and transformations.

What is claimed is:

1. A print recognition substrate, comprising:
    a base substrate, comprising a data line and a gate line crossing each other;
    a light shielding structure, located on the base substrate, and comprising at least one metal layer, wherein an orthographic projection of the light shielding structure on the base substrate does not overlap with orthographic projections of the data line and the gate line on the base substrate;
    a photoelectric conversion structure, located on a side of the light shielding structure away from the base substrate, wherein an orthographic projection of the photoelectric conversion structure on the base substrate is located in the orthographic projection of the light shielding structure on the base substrate, and a distance between an edge of the photoelectric conversion structure and an edge of the light shielding structure is less than or equal to 3 μm.

2. The print recognition substrate of claim 1, wherein the light shielding structure comprises a first electrode, and the first electrode is in the same layer as the gate line; or
    the light shielding structure comprises a second electrode, and the second electrode is in the same layer as the data line; or
    the light shielding structure comprises the first electrode and the second electrode, the first electrode is in the same layer as the gate line, the second electrode is in the same layer as the data line, and in an extending direction of the gate line, an orthographic projection of the edge of the photoelectric conversion structure on the base substrate is located in an orthographic projection of the first electrode on the base substrate, and in an extending direction of the data line, an orthographic projection of the edge of the photoelectric conversion structure on the base substrate is located in an orthographic projection of the second electrode on the base substrate.

3. The print recognition substrate of claim 2, wherein both ends of an edge of the photoelectric conversion structure close to the data line and both ends of an edge of the photoelectric conversion structure away from the data line are provided with chamfers recessed toward a center of the photoelectric conversion structure.

4. The print recognition substrate of claim 3, wherein a maximum distance between an orthographic projection of an edge of a chamfer on the base substrate and an orthographic projection of an edge of the second electrode on the base substrate is not less than 0 μm to 3 μm, and a maximum distance between an orthographic projection of an edge of the chamfer on the base substrate and an orthographic projection of an edge of the first electrode on the base substrate is not less than 0 μm to 3 μm.

5. The print recognition substrate of claim 2, wherein the orthographic projection of the photoelectric conversion structure on the base substrate has a first overlap area with the orthographic projection of the second electrode on the base substrate, and a ratio of the first overlap area to an area of the orthographic projection of the second electrode on the base substrate ranges from 0.6 to 0.8.

6. The print recognition substrate of claim 2, wherein the orthographic projection of the photoelectric conversion structure on the base substrate has a second overlap area with the orthographic projection of the first electrode on the base substrate, and a ratio of the second overlap area to an area of the orthographic projection of the first electrode on the base substrate ranges from 0.7 to 0.9.

7. The print recognition substrate of claim 2, wherein the orthographic projection of the first electrode on the base substrate has a third overlap area with the orthographic projection of the second electrode on the base substrate, and a ratio of the third overlap area to an area of the orthographic projection of the second electrode on the base substrate ranges from 0.5 to 0.8; or
the orthographic projection of the first electrode on the base substrate has a third overlap area with the orthographic projection of the second electrode on the base substrate, and a ratio of the third overlap area to an area of the orthographic projection of the first electrode on the base substrate ranges from 0.6 to 0.8.

8. The print recognition substrate of claim 2, wherein a minimum distance between the second electrode and the data line is a first distance, a second distance is between the orthographic projection of the first electrode on the base substrate and the orthographic projection of the data line on the base substrate, a minimum distance between the orthographic projection of the photoelectric conversion structure on the base substrate and the orthographic projection of the data line on the base substrate is a third distance, and the third distance is greater than the second distance and less than the first distance.

9. The print recognition substrate of claim 8, wherein the first distance $d_1$, the second distance $d_2$, and the third distance $d_3$ satisfy: $d_1$: $d_2$: $d_3$ ranges from 5:2:3 to 5:2:4.9.

10. The print recognition substrate of claim 8, wherein the first distance ranges from 7 μm to 9 μm, the second distance ranges from 3 μm to 5 μm, and the third distance ranges from 5 μm to 7 μm.

11. The print recognition substrate of claim 2, wherein a minimum distance between the orthographic projection of the second electrode on the base substrate and the orthographic projection of the gate line on the base substrate is a fourth distance, a minimum distance between the first electrode and the gate line is a fifth distance, a minimum distance between the orthographic projection of the photoelectric conversion structure on the base substrate and the orthographic projection of the gate line on the base substrate is a sixth distance, and the sixth distance is greater than the fourth distance and less than the fifth distance.

12. The print recognition substrate of claim 11, wherein the fourth distance d4, the fifth distance $d_5$, and the sixth distance $d_6$ satisfy: $d_4$: $d_5$: $d_6$ ranges from 2:6: 5 to 2:6: 4.

13. The print recognition substrate of claim 11, wherein the fourth distance ranges from 2 μm to 5 μm, the fifth distance ranges from 7 μm to 9 μm, and the sixth distance ranges from 5 μm to 7 μm.

14. The print recognition substrate of claim 2, further comprising a transistor, wherein a gate of the transistor is in the same layer as the gate line, a first pole and a second pole of the transistor are in the same layer as the data line;
the gate of the transistor is electrically connected to the gate line, the first pole of the transistor is electrically connected to the data line, and the second pole of the transistor is electrically connected to the second electrode; and
an orthographic projection of the transistor on the base substrate does not overlap with the orthographic projection of the first electrode on the base substrate and the orthographic projection of the photoelectric conversion structure on the base substrate.

15. The print recognition substrate of claim 14, wherein a channel region of the transistor extends in the first direction; an edge of the data line adjacent to the channel region of the transistor is multiplexed as the first pole of the transistor, and the second pole of the transistor is disposed opposite the first pole of the transistor on one side of the channel region; or
a channel region of the transistor is in an inverted L-shape, the first pole of the transistor is integrated with the data line, and the first pole of the transistor is on a side of the data line close to the channel region of the transistor; the second pole of the transistor extends from a side of the first pole of the transistor away from the gate line to a side of the first pole of the transistor away from the data line; or
a channel region of the transistor is in a horizontal U-shape, the first pole of the transistor is integrated with the data line, and the first pole of the transistor is on a side of the data line close to the photoelectric conversion structure; the second pole of the transistor extends from a side of the first pole of the transistor away from the gate line, through a side of the first pole of the transistor away from the data line, to a side of the first pole of the transistor close to the gate line.

16. The print recognition substrate of claim 14, further comprising: a light shielding portion located on a side of the photoelectric conversion structure away from the base substrate; and
an orthographic projection of the light shielding portion on the base substrate covers at least an orthographic projection of the channel region of the transistor on the base substrate.

17. The print recognition substrate of claim 16, wherein the orthographic projection of the light shielding portion on the base substrate covers the orthographic projection of the transistor and the orthographic projection of the gate line on the base substrate.

18. The print recognition substrate of claim 16, further comprising a bias line between a layer where the light shielding portion is located and a layer where the photoelectric conversion structure is located, wherein the bias line is in direct contact with the light shielding portion.

19. The print recognition substrate of claim 18, further comprising a third electrode located between a layer where the light shielding portion is located and a layer where the photoelectric conversion structure is located; and the third electrode is electrically connected to the bias line, the third electrode is stacked with the photoelectric conversion structure, and the second electrode, the photoelectric conversion structure, and the third electrode which are stacked constitute a photo sensor.

20. A print recognition apparatus, comprising a backlight module and a print recognition substrate, wherein the print recognition substrate is the print recognition substrate of claim 1, and the print recognition substrate is on a light-emitting side of the backlight module.

* * * * *